Jan. 13, 1970     D. C. SAYLES     3,489,714
SELF-EXTINGUISHING COMPOSITION COMPRISING POLYBUTADIENEACRYLIC
ACID OR CARBOXY-TERMINATED POLYBUTADIENE
Filed July 21, 1967
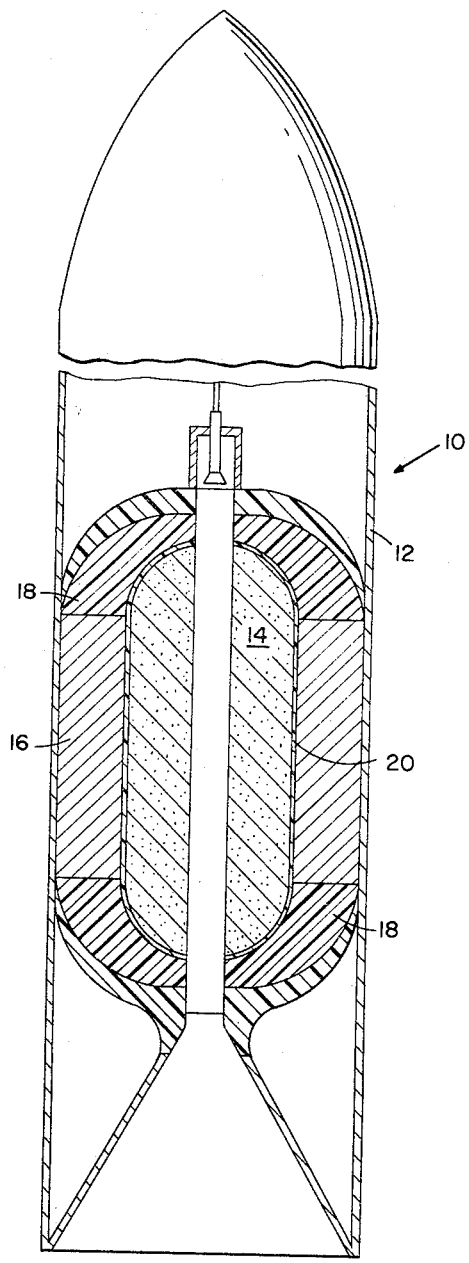
David C. Sayles,
INVENTOR.
Harry M. Saragovitz
BY Edward J. Kelly
Herbert Berl Attorneys.
Elihu L. Turetsky
Agent

United States Patent Office 3,489,714
Patented Jan. 13, 1970

3,489,714
SELF-EXTINGUISHING COMPOSITION COMPRISING POLYBUTADIENEACRYLIC ACID OR CARBOXY-TERMINATED POLYBUTADIENE
David C. Sayles, Huntsville, Ala., assignor to the United States of America as represented by the Secretary of the Army
Filed July 21, 1967, Ser. No. 655,736
Int. Cl. C09k 3/28; C08f 45/58, 45/10
U.S. Cl. 260—41　　　　　　　　　　　　　　6 Claims

ABSTRACT OF THE DISCLOSURE

The invention is to be a self-extinguishing liner composition, for use in solid propellant motors, comprising a cured intimate mixture of an organic polymeric binder such as polybutadieneacrylic acid or carboxy-terminated polybutadiene; an inorganic insulative material such as asbestos, silica or graphite; a perbromo-compound such as pentabromoethane, bromal hydrate or tris(perbromoethyl)phosphate; and a chemical synergist such as nitrosoamines, e.g., N-nitroso-N-methylaniline, N-nitrosocarbazole or N-nitrosodiphenyl amine, or chloramides, e.g. N,N-dichlorotoluenesulfonamide, or N,N'-dichloro-N,N'-diphenylurea.

BACKGROUND OF THE INVENTION

This invention relates to an improved liner composition for use in solid propellant motors and particularly to a linear composition for use in solid propellant motors which will (if caused to burn during the latter phases of propellant combustion) extinguish itself.

During the final phases of the burning of the solid propellant in a rocket motor, some burning of the motor liners occurs in prior art liners. Since such a liner does not contain any oxidizer, it will, however, burn inefficiently, producing carbonaceous particles along with underoxidized gases (especially carbon monoxide and hydrogen). These gases undergo ignition when exhausted, producing afterburning and chemi-ionization. The resulting hot, ionized gases produce microwave attenuation and interfere with the communication signals between the launch site and the missile. Additionally, the carbonaceous particles produce a trail of smoke which is especially undesirable in tactical missile sites.

The prior art has attempted the use of various additives to the liner composition to improve its properties. In particular, asbestos has been incorporated into the liner composition to increase its resistance to combustion. However, this has not proven entirely successful since the rubber matrix which binds the asbestos together is the type of organic matter which will char and leave a trail of smoke.

Accordingly, it is an object of this invention to provide an improved liner composition for use in solid propellant motors.

It is another object of this invention to provide a liner composition which will not leave a trail of smoke, if caused to burn.

It is a particular object of this invention to provide a self-extinguishing liner composition for use in solid propellant motors.

SUMMARY OF THE INVENTION

It has been discovered that certain perbromo-compounds such as pentabromoethane, bromal hydrate and tris(perbromoethyl)phosphate may be combined with certain chemical synergists such as chloroamides and nitrosoamines in order to impart self-extinguishing characteristics to a liner composition. The liner composition contains a binder, inorganic insulative material and a curative.

BRIEF DESCRIPTION OF THE DRAWING

These and other objects and advantages of this invention will become more readily appreciated as the same becomes better understood by reference to the following detailed description when considered in conjunction with the accompanying drawing which forms an integral part thereof:

The single figure shows a partially cutaway view of the rocket employing the liner composition of this invention.

DESCRIPTION OF THE PREFERRED EMBODIMENT

Referring now to the single figure, a rocket motor 10 has a cylindrical casing or housing 12 defining a chamber in which is loaded a large cylindrical propellant grain 14 having an internal perforation. Slivers 16 are bonded to the cylindrical portion of casing 12, and insulation 18 is bonded to the forward and aft ends of slivers 16. Liner 20 (shown exaggerated) is then applied by spraying, to the entire interior surface and over the insulation 18 and slivers 16. Curing of the liner 20 is then effected and thereafter propellant 14 is cast and cured.

Liner 20 is made of a composition of a perbromo-compound and a chemical synergist.

Preferred perbromo-compounds are of the aliphatic variety. They are preferred because of their low cost and simplicity of manufacture.

Typical examples of aliphatic perbromo-compounds which have proven satisfactory are pentabromoethane, bromal hydrate and tris(perbromoethyl)phosphate.

Chemical synergists which function satisfactorily to impart self-extinguishing characteristics to the liner are chloroamides and nitrosoamines.

Typical examples of chloroamides which have proven satisfactory are N,N-dichlorotoluenesulfonamide, and N,N'-dichloro-N,N'-diphenylurea.

Typical examples of nitrosoamines which have proven satisfactory are N-nitroso-N-methylaniline, N-nitrosocarbazole and N-nitrosodiphenylamine.

The concentrations of the perbromo-compound and chemical synergist used in this invention are each typically of the order of 1–3 weight percent of the liner composition.

While I do not wish to be limited by any proposed theory, the following is the probable partial mechanism of catalyzed reactions.

(1) Reaction

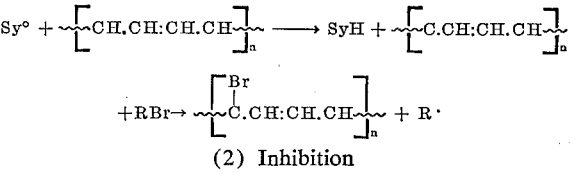

(2) Inhibition

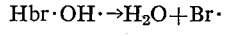

(3) Regeneration

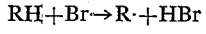

Uncatalyzed propagation would normally proceed along these routes with an adequate supply of oxidizer; however, propellant compositions are under-oxidized, so complete oxidation to products in the higher oxidized state does not occur fully.

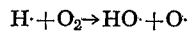

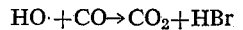

The liner composition of this invention, like prior art liner compositions, usually has a binder which is the same as that of the propellant, in order to insure compatibility between the propellant and the liner. The propellant binder can be used in this invention.

These additives which impart self-extinguishing characteristics can also be incorporated into various other inert resinous constituents of the rocket motor. These include: insulators, adhesives, boots, slivers, etc.

Binders used are typically either polybutadieneacrylic acid or carboxyl-terminated polybutadienes. Other organic polymeric binders may also be employed.

The liner composition also contains inorganic insulative materials such as asbestos, silica or graphite (normally 30–40% by weight of the liner composition).

Typically, the binder and insulative material total about 94% to about 98% by weight of the liner composition. A curative ingredient of negligible percentage is also included. The remaining 2% to 6% by weight of the liner composition is composed of the perbromo-compound and the chemical synergist.

A curative such as tris(methylaziridinyl)phosphine oxide or the butyleneimine adduct of trimesic acid is employed in order to cure the binder in the liner composition.

The curative is used in a 10% excess of what would be an equimolar amount of the binder.

Various modifications and variations of this invention will become readily apparent to those skilled in the art in the light of the above teachings, which modifications and variations are within the spirit and scope of this invention.

I claim:

1. A liner composition, for use in solid propellant motors, comprising: a cured intimate mixture of an organic polymeric binder selected from polybutadieneacrylic acid and carboxyl-terminated polybutadiene; an inorganic insulative material; a perbromo-compound selected from pentabromoethane, bromal hydrate and tris(perbromoethyl)-phosphate; and a chemical synergist comprising a nitrosoamine selected from N-nitroso-N-methylaniline, N-nitrosocarbazole and N-nitrosodiphenylamine or chloroamide selected from N,N-dichlorotoluenesulfonamide and N,N'-dichloro-N,N'-diphenylurea, the total weight percentages of said organic polymeric binder and said inorganic insulative material being about 94% of said liner composition.

2. The liner composition of claim 1 wherein said chemical synergist is a nitrosoamine.

3. The liner composition of claim 1 wherein said chemical synergist is a chloroamide.

4. The liner composition of claim 1 wherein the concentration of said perbromo-compound is from about 1% to about 3% by weight and the concentration of said chemical synergist is from about 1% to about 3% by weight of said liner composition.

5. The liner composition of claim 4 additionally comprising a curative, said curative comprising the butyleneimine adduct of trimesic acid or tris(methylaziridinyl)phosphine oxide.

6. The liner composition of claim 5 wherein the molar concentration of said curative is a slight excess of an equimolar amount of said binder.

References Cited

UNITED STATES PATENTS

| 3,047,425 | 7/1962 | Hirshfeld et al. | 117—137 |
| 3,133,038 | 5/1964 | Hahn | 260—41 |
| 3,222,305 | 12/1965 | Lanham. | |
| 3,311,585 | 3/1967 | Edlin. | |

LELAND A. SEBASTIAN, Primary Examiner

U.S. Cl. X.R.

102—103; 117—137; 149—109; 260—45.9; 264—3